Patented July 13, 1926.

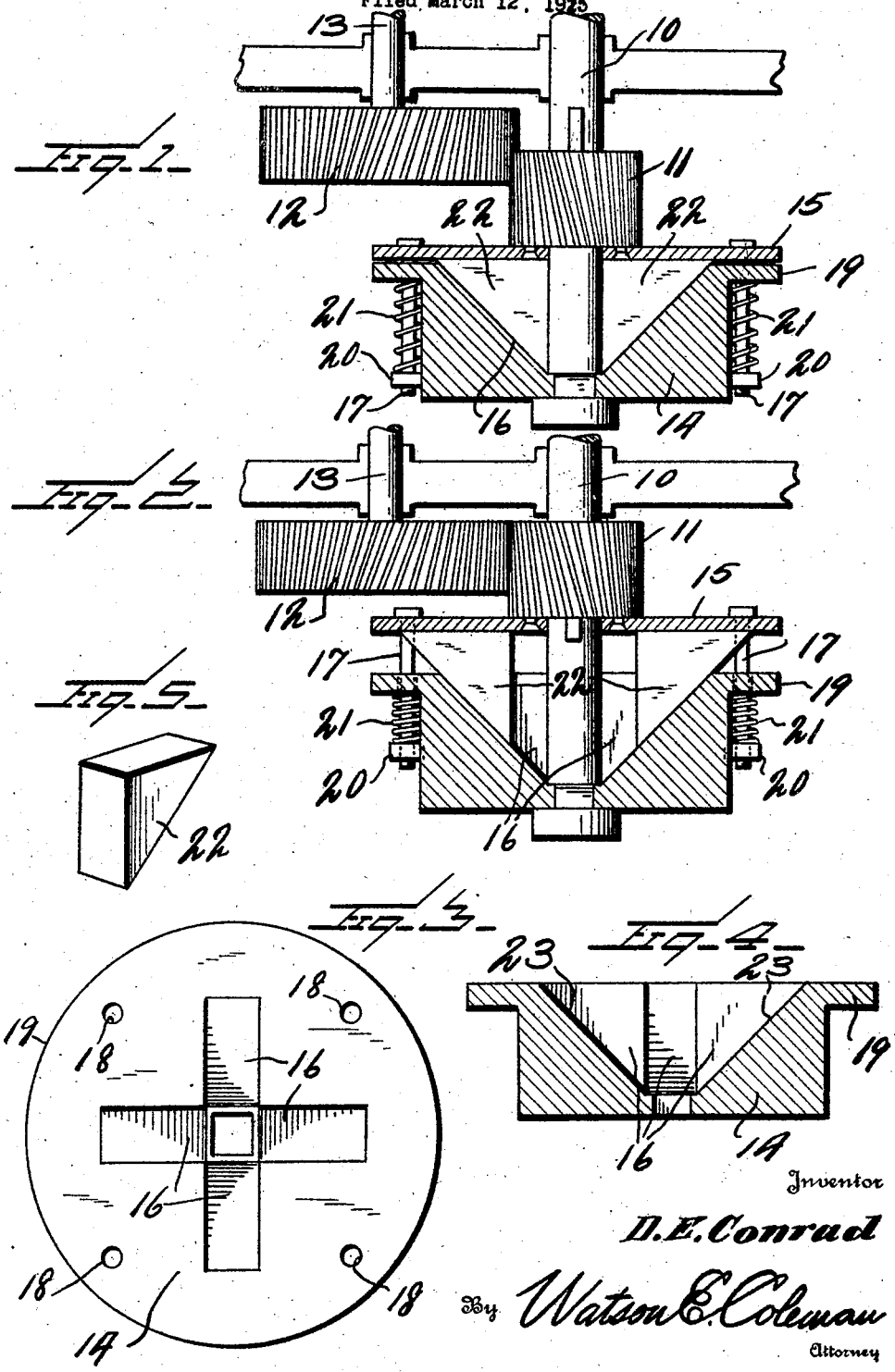

1,592,083

UNITED STATES PATENT OFFICE.

DAVID EMERY CONRAD, OF ELDON, IOWA, ASSIGNOR OF ONE-HALF TO VAN V. BALDWIN, OF ELDON, IOWA.

VALVE CONTROL.

Application filed March 12, 1925. Serial No. 15,107.

This invention relates to control apparatus for the valves of internal combustion engines and more particularly to means for automatically controlling the operation of the valves of the engine to insure opening thereof in proper relation to the timing of explosions of the engine. As those familiar with the art are well aware, the timing of internal combustion engines is usually advanced as the speed of the engine increases and it follows that in order to have proper co-ordination of the valves with such timing, the timing of the valves should be likewise advanced. This advance of the valves in accordance with the increases of the speed of the engine has been heretofore accomplished but the mechanism so employed have been faulty in that they do not provide for a smooth operation of the valve shifting mechanism and place undue strain upon the small shaft usually employed for supporting the cams by means of which the valves are operated. An important object of this invention is accordingly the provision of a device which will effect the change of the phase relation of the cam shaft without placing undue strain upon this engine.

A further object of the invention is the provision of a novel and improved governor for use in conjunction with an automatic valve shifting mechanism of this character.

These and other objects I attain by the construction shown in the accompanying drawings, wherein for the purpose of illustration is shown a preferred embodiment of my invention and wherein:—

Figure 1 is a plan view partial in section showing a governor control phase changing mechanism for valves constructed in accordance with my invention, the parts being in a position assumed when the engine is at rest or when the speed of operation is low;

Figure 2 is a similar view showing the position assumed by the parts when the speed of the engine increases;

Figure 3 is a bottom plan view of the cover plate or stationary plate of the governor;

Figure 4 is a transverse sectional view therethrough and;

Figure 5 is a perspective view of one of the governor weights.

Referring now more particularly to the drawings, the numeral 10 indicates the main or crank shaft of an internal combustion engine and 11 a drive gear carried thereby for the purpose of driving the cam shaft gear 12 attached to the cam shaft 13 by means of which the valves are controlled. In the usual construction employed, the gears 11 and 12 are spiral gears and the gear 12 has twice the number of teeth that are supplied to the gear 11. The gear 11 is usually rigidly mounted upon the shaft 10 but in accordance with my invention is slidably keyed thereon as indicated. It will be obvious that by shifting this gear 11 upon its shaft and at the same time preventing its rotation with relation to the shaft. The spiral teeth of this gear acting against the spiral teeth of the gear 12 will cause the gear 12 to be partially rotated with relation to the shaft 10, the direction of rotation depending upon the direction of movement of the gear 11.

Upon the outer end of the shaft 11 I mount a governor plate 14 which is rigid to the shaft 10 and rotates therewith and to the gear 11 I secure a movable governor plate 15. The rigid governor plate has the inner surface thereof formed with radially directed grooves 16 each increasing in depth from the outer side of the plate toward the center thereof. Secured to the plate 15 and extending outwardly therefrom are posts 17 directed through openings 18 formed in a flange 19 upon the plate 14. The outer ends of these posts 17 have heads 20 and between these heads and the flange 19, springs 21 are disposed which act to draw the posts through the openings 18 and accordingly to bring the plate 15 into engagement with the adjacent face of the plate 14. Mounted upon the plate 15 are a plurality of sliding weights 22 each in the form of a weight having their upper surfaces inclined at the same angle of inclination as the opposed or base walls 23 of the grooves 16. A second face of these weights slidably abuts the plate 15.

The operation of the device is as follows: The spring 21 normally draws the plates 15 into engagement with the adjacent face of the plate 14 and the weights are arranged at the inner limit of their movement and against the shaft 10. As the speed of the engine increases, the centrifugal force causes the weights to move outwardly when they act as weights separating the plates 14 and 15 and causing the plate 15 to move longitudinally of the shaft 10. This longitudinal movement by reason of the spiral teeth of the gear 11 is transposed to rotating movement which is imparted to the gear 12 with the result that the gear 12 is advanced, advancing the timing of the cams and changing the phase relation thereof with relation to the crank shaft 10. By moving the smaller gear 11 in the manner above described, a great deal of the thrust present, when an attempt is made to accomplish this movement, through the gear 12, is eliminated and a very steadily operating and efficient mechanism is produced.

It will be obvious that this construction may be very readily applied to an internal combustion engine and that the weight of the governor applied to the forward end of the crank shaft will have a tendency to steady the same operating in a measure as a small fly wheel at the forward end of the shaft. Attention is directed to the fact that if the governor is on the crank shaft, its weight will have no effect upon the gears or teeth. In case of back firing or sudden stopping of the motor as this governor is solid on the crank shaft and independent of the gears, it will have no effect thereon. If, however, this governor was mounted on the cam shaft, the strain would all come on the teeth of the gears straining them and eventually breaking the same. Furthermore, where this strain is applied to the large gear, the gears would wear out rapidly and furthermore the sliding of this large gear on its shaft has a tendency to wear the splines and the plate resulting from this wear of the splines would be increased by the increased diameter of such gear. With a small gear, such as is ordinarily employed on the crank shaft of an engine, a slight wear on the spline would not result in an appreciable movement of the outer circumference of the gear and this movement of the outer circumference would be divided by two, assuming the proportions of the gears are those ordinarily employed, before it reached the cam shaft so that the percentage of error will be materially reduced.

It will furthermore be obvious that the structure hereinbefore set forth is capable of a considerable range of change and modification without materially departing from the spirit of my invention and I accordingly do not limit myself to such specific structure except as hereinafter claimed.

I claim:—

1. A governor including stationary and movable plates, wedge-shaped weights disposed between said plates and urged outwardly to separate the plates as the plates are rotated and springs connecting said stationary and movable plates urging the movable plate toward the stationary plate, said stationary plate having radially extending slots having inclined faces facing the weights and having the same degree of inclination as the engaged faces of the weights the movable plate having a flat face confronting said weights.

2. A governor including stationary and movable plates, wedge-shaped weights disposed between said plates and urged outwardly to separate the plates as the plates are rotated and springs connecting said stationary and movable plates urging the movable plate toward the stationary plate, said stationary plate comprising a relatively heavy solid metal body having formed in the face thereof adjacent the movable plate grooves within which said governor weights operate.

3. A governor including a relatively heavy metal body having formed in one face thereof grooves decreasing in depth toward the outer edge of the body, a flat plate confronting the grooved face of the body, said body and plate constituting the stationary and movable elements of the governor, posts secured to one of said elements and directed through a flange formed upon the other of the elements, springs surrounding said posts and engaging the flange to force the elements toward one another and wedge-shaped weights disposed within the grooves of the heavy body and urged outwardly to separate the elements when the plates are rotated.

In testimony whereof I hereunto affix my signature.

DAVID EMERY CONRAD.